June 17, 1947.　　　　H. MASBRUCH　　　　2,422,308
HALTER
Filed April 16, 1946
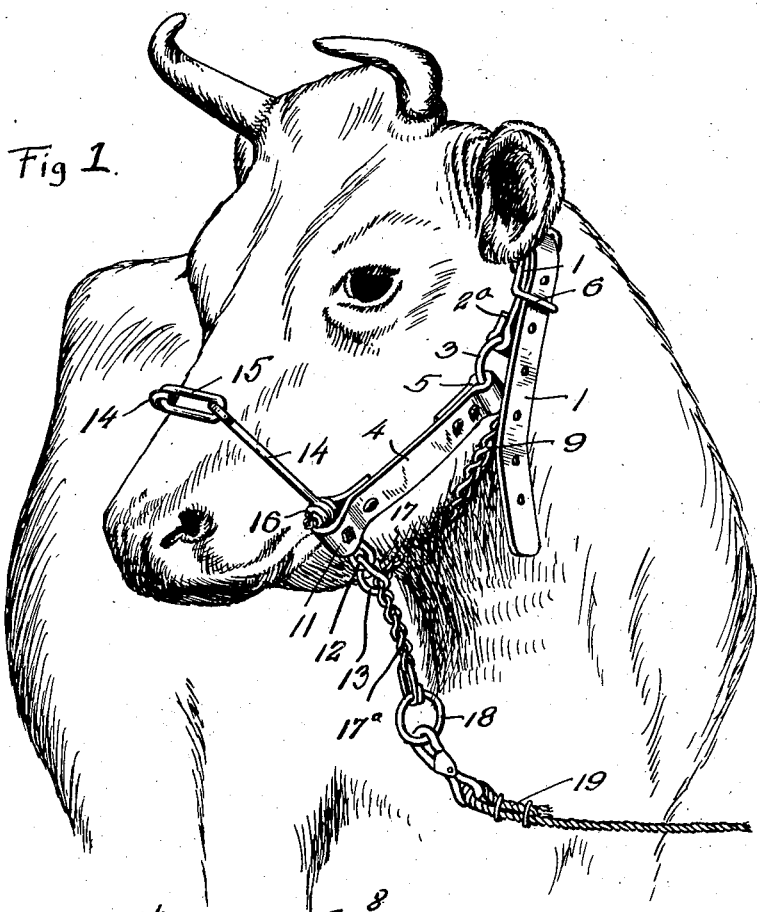
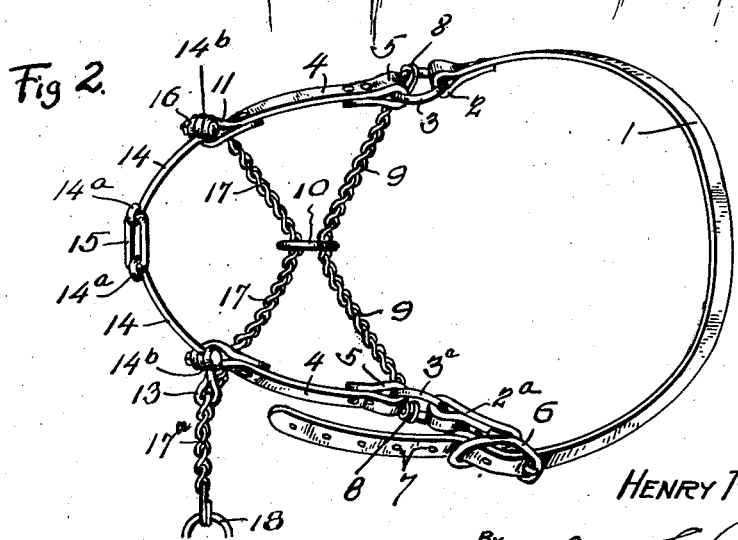
INVENTOR
HENRY MASBRUCH
By Lester L. Sargent
ATTORNEY Patented June 17, 1947

2,422,308

UNITED STATES PATENT OFFICE 2,422,308

HALTER

Henry Masbruch, Platteville, Wis.

Application April 16, 1946, Serial No. 662,505

2 Claims. (Cl. 54—24)

The object of my invention is to provide a novel halter for controlling unruly animals or for breaking animals to lead and to provide a halter which can be used on cows, bulls or horses.

I attain the objects of my invention by the mechanism illustrated in the accompanying drawings, in which Figure 1 is a perspective view of the invention applied to an animal; and Fig. 2 is a plan view of the halter detached from the animal.

Like characters of reference designate like parts in each of the views.

Referring to the accompanying drawings—I provide a strap 1 passing over the head and behind the ears of the animal, this strap terminating at one end in a loop 2 which engages one of rings 3. The other end of the strap has spaced buckle openings which are adjustably engaged by the buckle 6. The buckle 6 is connected by a link looped strap 2a to a ring 3a opposite to and corresponding in function to the ring 3. The opposite cheek straps 4 terminate at their upper ends in loops 5 which are engaged in the rings 3 and 3a, as shown in Fig. 2. Straps 4, at their lower ends terminate in loops 11. I provide a chain 9 which extends under the throat of the animal and which has end links 8 engaging the rings 3 and 3a. I also provide a chain 17 which is connected to chain 9 by a connecting element 10 which may be either a ring, as shown, or a short chain. For cattle the ring will be used; for horses a short chain will function better. A link 12 extends through one of the lower cheek strap loops 11 and is engaged by the loop 16 of the side nose link 14, which in turn, at its other end engages the central nose link 15, the lower link in turn being engaged by another side nose link 14, as shown in Fig. 1 and this latter link 14 has its loop 14b engaged in the loop 16 secured to the loop 11 of the adjacent side cheek strap 4. The chain 17 extends under the chin of the animal, passes freely through the link 13 and has a depending end portion 17a which is connected to the ring 18. In use, if the animal follows along docilely, he is not inconvenienced by the halter. If the animal is unruly, a pull on the chain 17 will cause a pull on links 14 which will tighten the central link 15 over the nose, punishing the animal and making its control possible.

What I claim is:

1. In a halter for controlling unruly animals, the combination of an adjustable head strap, cheek straps connected to the head strap, a throat chain also connected to the head strap, a chin chain having its central portion operatively connected to the throat chain, side nose links, a central nose link connected to each of the side nose links, a link through which the chin chain freely passes, said chin chain being of sufficient length to have a depending end portion and carrying a ring to which a conventional halter strap may be detachably engaged, whereby increased tension on the chin chain will tighten the nose links and enable the person leading an unruly animal to control the animal.

2. In combination with a halter, metal links including a central straight link and stiff side links, the central link extending over the nose of the animal, a chain extending under the chin of the animal, a link operatively connected to the nose links and through which one end of said chin chain freely passes and a ring carried by the end of said chain whereby a halter may be secured to the chain to permit of controlling the animal by pulling on the halter and the chin chain and thus causing pressure to be exerted on the central link that passes over the nose of the animal.

HENRY MASBRUCH.

REFERENCES CITED

The following references are of record in the file of this patent:

UNITED STATES PATENTS

| Number | Name | Date |
|---|---|---|
| 1,252,667 | Crawford | Jan. 8, 1918 |
| 1,410,573 | Jensen | Mar. 28, 1922 |